United States Patent
Russell

(10) Patent No.: US 7,480,245 B2
(45) Date of Patent: Jan. 20, 2009

(54) SEGMENTING DATA PACKETS FOR OVER-NETWORK TRANSMISSION AT ADJUSTABLE FRAGMENT BOUNDARY

(75) Inventor: Paul F. Russell, Queanbeyan (AU)

(73) Assignee: International Business Machines Corporation, Armonk, NY (US)

( * ) Notice: Subject to any disclaimer, the term of this patent is extended or adjusted under 35 U.S.C. 154(b) by 800 days.

(21) Appl. No.: 11/010,212

(22) Filed: Dec. 11, 2004

(65) Prior Publication Data
US 2006/0126510 A1    Jun. 15, 2006

(51) Int. Cl.
G06F 11/00    (2006.01)
G06F 13/14    (2006.01)
H04J 3/24    (2006.01)

(52) U.S. Cl. ............. 370/235; 370/349; 370/428; 370/471; 709/236

(58) Field of Classification Search ......... 370/231, 370/235, 395.7, 428, 471, 474, 342–349; 709/231–242
See application file for complete search history.

(56) References Cited

U.S. PATENT DOCUMENTS

| 2001/0024435 A1* | 9/2001 | Birdwell et al. ............. 370/349 |
| 2002/0156908 A1 | 10/2002 | Basso et al. |
| 2004/0008713 A1 | 1/2004 | Knight et al. |

* cited by examiner

*Primary Examiner*—Afsar M. Qureshi
(74) *Attorney, Agent, or Firm*—Steven Lieske Bennett

(57) ABSTRACT

A data packet to be transmitted over a network is segmented at an adjustable fragment boundary. The fragment boundary is the maximum amount of data of the data packet to be sent, segmented, or divided into a given packet fragment for over-network transmission. The data packet has an n-bit identifier, such that the packet fragments into which the data packet has been segmented each has this same n-bit identifier. The packet fragments are transmitted over a network. If the n-bit identifier is at a maximum value, then the fragment boundary is adjusted so that it is now different. The n-bit identifier is then increased, such that the n-bit identifier rolls over to a minimum value when increased after being at the maximum value. The process is repeated for each additional data packet to be transmitted over the network.

9 Claims, 7 Drawing Sheets

SEGMENTING DATA PACKETS FOR OVER-NETWORK TRANSMISSION AT ADJUSTABLE FRAGMENT BOUNDARY

FIELD OF THE INVENTION

The present invention relates generally to segmenting data packets for transmission over a network, and more particularly to segmenting such data packets at a fragment boundary that is adjustable.

BACKGROUND OF THE INVENTION

Communication networks allow computing devices to communicate with one another. A computer at one location, for instance, can send data to and receive data from a computer at another location, if the two computers are communicatively coupled to a network. Networks of this type include wired and wireless networks, Ethernet-type networks, intranets, extranets, the Internet, and/or telephony networks, among other types of networks.

Many types of networks are packet-driven, or packetized, networks. Such networks allow data to be communicated thereover by having a data packet split into a number of different packet fragments, which are smaller packets of data that actually traverse the network. For instance, 2,000 bytes of data within a data packet may be split over four packet fragments, each containing 500 bytes of the data. The data packet is typically assigned an identifier, where each of the packet fragments into which the data packet has been segmented is also assigned this same identifier. If the packet fragments are received out of order, they are reordered by the receiving device. Some such types of networks include Internet Protocol (IP) networks, including Transmission Control Protocol (TCP)/IP networks and User Datagram Protocol (UDP)/IP networks, among others.

A difficulty with such packetized networks arises when a packet fragment is lost, and a subsequently received packet fragment is presumed to be the lost packet. For example, four packet fragments may be sent from a first computer to a second computer, each containing 500 bytes of data. The packet fragments are assigned the identifier of their parent data packet. At the second computer, the first, second, and fourth packet fragments may be received, but the third packet fragment may have been lost when being transmitted over the network.

The second computer will wait for a predetermined length of time for this packet fragment before signaling to the first computer that it was not received, and that the first computer should resend it. While the second computer is waiting for the packet fragment, however, a different packet fragment with the same identifier may be received. Therefore, the second computer believes that this different packet fragment is the packet fragment it has been waiting for. However, because the packet fragment only coincidentally has the same identifier as the lost packet fragment, the second computer actually does not have the correct packet fragment, and Will not properly reassemble the data packet.

This problem arises especially in situations where large amounts of data are being sent from one computer to another computer over a fast network. The identifiers assigned to data packets may be sixteen bits in length. Therefore, each identifier is a hexadecimal number within the range 0x0000 through 0xFFFF. A first data packet, and its packet fragments, may be assigned the identifier 0x0000, the second packet and its fragments may be assigned the identifier 0x0001, the third packet and its fragments may be assigned the identifier 0x0002, and so on, in order. Once the identifier 0xFFFF has been assigned to a data packet, the identifiers "roll over"— that is, data packets and their packet fragments are assigned identifiers beginning with 0x0000 again.

Therefore, the problem that has been described can occur in the following situation. Data packets and their packet fragments to be sent to a computer are assigned identifiers 0x0000, 0x0001, and 0x0002, for instance. The computer receives all the packet fragments for the data packets assigned identifiers 0x0000 and 0x0001, but does not receive all the packet fragments for the data packet assigned identifier 0x0002. The computer waits a predetermined length of time before requesting that the packet fragment or fragments in question be resent.

However, while the computer is waiting this length of time, further packet fragments of other data packets are sent to the computer, where the data packets and their packet fragments are assigned identifiers through 0xFFFF, such that the identifiers roll over. The computer again begins to receive the new packet fragments of these new packets that have been assigned identifiers starting with 0x0000, such that the computer receives new packet fragments having the identifier 0x0002. These new packet fragments, however, are different than the packet fragments that the computer is waiting for, in that they are associated with a different data packet having the same identifier 0x0002. That is, the packet fragment or fragments that the computer is waiting for are related to a different packet having the identifier 0x0002 than the data packet having the identifier 0x0002 to which the new packet fragments that have been received are related. Because the new packet fragments also have the identifier 0x0002, however, the computer may conclude that it has received the packet fragments that it has been waiting for, when in fact it has not. Data packets will therefore be assembled from incorrect packet fragments.

One way to prevent this problem is to include a checksum value for a data packet that is being segmented into a number of packets fragments to be sent to a computer over a network. A checksum value is a value used to ensure data are stored or transmitted without error. It is created by calculating the binary values in a block of data according to an algorithm and storing the results with the data. When the data is received by the computer over the network, a new checksum is determined and matched against the existing checksum. A non-match indicates an error, such that the data was not properly received.

For instance, 1,500 bytes of data within a data packet may be sent to a computer, with the data packet having a specific identifier, and the data packet being segmented into three packet fragments. In one of these three fragments, a checksum value CV1 is included for the entire data packet. When the computer receives all the packet fragments, it computes its own checksum value CV2 based on the data packet assembled from the packet fragments. If the checksum value CV2 does not match the checksum value CV1, then the computer concludes that it has not received the data packet correctly, and requests that the data packet be resent.

For example, the second packet fragment may have been lost during transmission over the network, where the computer did receive the first and the third packet fragments, and did receive the checksum value CV1. While the computer is waiting for the second packet fragment, it may receive another, different packet fragment with the same data packet identifier, because the packet identifiers have rolled over as has been described. The computer assembles the data from the correct first and third packet fragments, and from the incorrect second packet fragment coincidentally having the same identifier, and computes a checksum value CV2. Since the second packet fragment is not the correct packet fragment, however, in all likelihood the checksum value CV2 will not match the checksum value CV1. Therefore, the computer can conclude that it has not received the 1,500 bytes of data correctly.

However, the checksum value itself may be a limited-length value, such as sixteen bits in length. This means that even if the incorrect packet fragment is received with the correct identifier, there is still nevertheless a one in $2^{16}=65,536$ chance that the determined checksum value CV2 will match the checksum value CV1. Thus, a small chance remains that the computer will conclude that it has received the data packet correctly when in fact it has not. Therefore, even using checksum values does not ensure that this identifier-rollover problem can be detected. Although using a longer-length checksum value decreases the odds that the problem will occur, there is a practical limit as to how many bits in length checksum values can be. Furthermore, the odds that the problem will occur will never decrease completely to zero, such that regardless of the number of bits of the checksum value, the problem can still occur.

For these and other reasons, therefore, there is a need for the present invention.

SUMMARY OF THE INVENTION

The invention relates to segmenting data packets for transmission over a network at an adjustable fragment boundary. A method of invention segments a data packet at a fragment boundary into one or more packet fragments. The fragment boundary is defined herein as the maximum amount of data of the data packet to be sent, segmented, or divided into a given packet fragment for over-network transmission. For example, a fragment boundary of 500 bytes means that no more than 500 bytes of the data packet are included in each packet fragment. The data packet has an n-bit identifier, such that the packet fragments into which the data packet has been segmented each has this same n-bit identifier. The packet fragments are transmitted over a network.

If the n-bit identifier is at a maximum value, then the fragment boundary is adjusted so that it is now different. For example, if the identifier is sixteen bits in length, and is currently equal to the value 0xFFFF, then the fragment boundary may be decreased from 500 bytes by one byte to 499 bytes. The n-bit identifier is then increased, such that the n-bit identifier rolls over to a minimum value when increased after being at the maximum value. For example, if the identifier is sixteen bits in length, and is currently equal to the maximum value 0xFFFF, then increasing the identifier causes it to roll over to the minimum value 0x0000. The method repeats for each additional data packet to be transmitted over the network.

Another method of the invention receives a packet fragment transmitted over a network. The method examines the n-bit identifier of the packet fragment to select a data packet into which the packet fragment is to be inserted. Where the packet fragment has an amount of data equal to an amount of data needed within the data packet to fit therewithin, the packet fragment is so inserted into the data packet. Furthermore, where the amount of data of the packet fragment is greater than the amount of data needed within the data packet to fit therewithin, the method may determine whether an excess amount of data of the packet fragment matches an overlapped amount of data already within the data packet. If the excess matches the overlapped data, the packet fragment is inserted into the data packet. Otherwise, the packet fragment is discarded.

A computing system of the invention includes a communication mechanism, a data packet dividing mechanism, and optionally a data packet assembling mechanism. The communication mechanism is communicatively coupled to a network to send first packet fragments over the network and to receive second packet fragments over the network. The data packet dividing packet fragments first data packets into the first packet fragments at a dynamically adjustable fragment boundary, such that the boundary changes every time n-bit identifiers of the first data packets roll over. The data packet assembling mechanism is to assemble second data packets from the second packet fragments.

An article of manufacture of the invention includes a computer-readable medium and means in the medium. The medium may be a recordable data storage medium, a modulated carrier signal, or another type of computer-readable medium. The means in the medium is for segmenting first data packets into first packet fragments at a dynamically adjustable fragment boundary, such that the boundary changes every time n-bit identifiers of the first data packets roll over. The means may also be for assembling second data packets from second packet fragments.

Embodiments of the invention provide for advantages over the prior art. In particular, the problem with the prior art recognizing the wrong packet fragment due to the packet fragment having the same identifier as the packet fragment that is being waited for is largely prevented in a way that does not require checksum values. For example, the fragment boundary may specify that a data packet be divided no more than 500 bytes at a time into packet fragments. Thus, a 1,500 data packet may be divided into three packet fragments, each containing 500 bytes of the data packet, and each having the same n-bit identifier as the data packet does. Assuming sixteen-bit identifiers, these three packet fragments of this data packet may have the last identifier before the identifier rolls over: 0xFFFF. The second packet fragment of the data packet identifying this data packet by the identifier 0xFFFF may have been lost, such that the receiving computing device is waiting for a 500-byte packet fragment having the identifier 0xFFFF.

When the identifiers roll over, the fragment boundary may be lowered by a byte to 499 bytes. Thus, subsequent packet fragments will contain 499 bytes of data—that is, data packets will be segmented into packet fragments such that no more than 499 bytes of data of a data packet is contained in any given packet fragment. The receiving computing device may thus receive a different packet fragment identifying a different data packet having the identifier 0xFFFF while it is waiting for the earlier packet fragment having this identifier and that contains 500 bytes of data. However, this different packet fragment will only contain 499 bytes of data, because the fragment boundary had rolled over, causing the fragment boundary to be changed. Because the receiving computing device is expecting a 500-byte packet fragment having the identifier 0xFFFF, it is able to recognize that the 499-byte packet fragment having this same identifier is not the packet fragment that the device has been waiting for.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
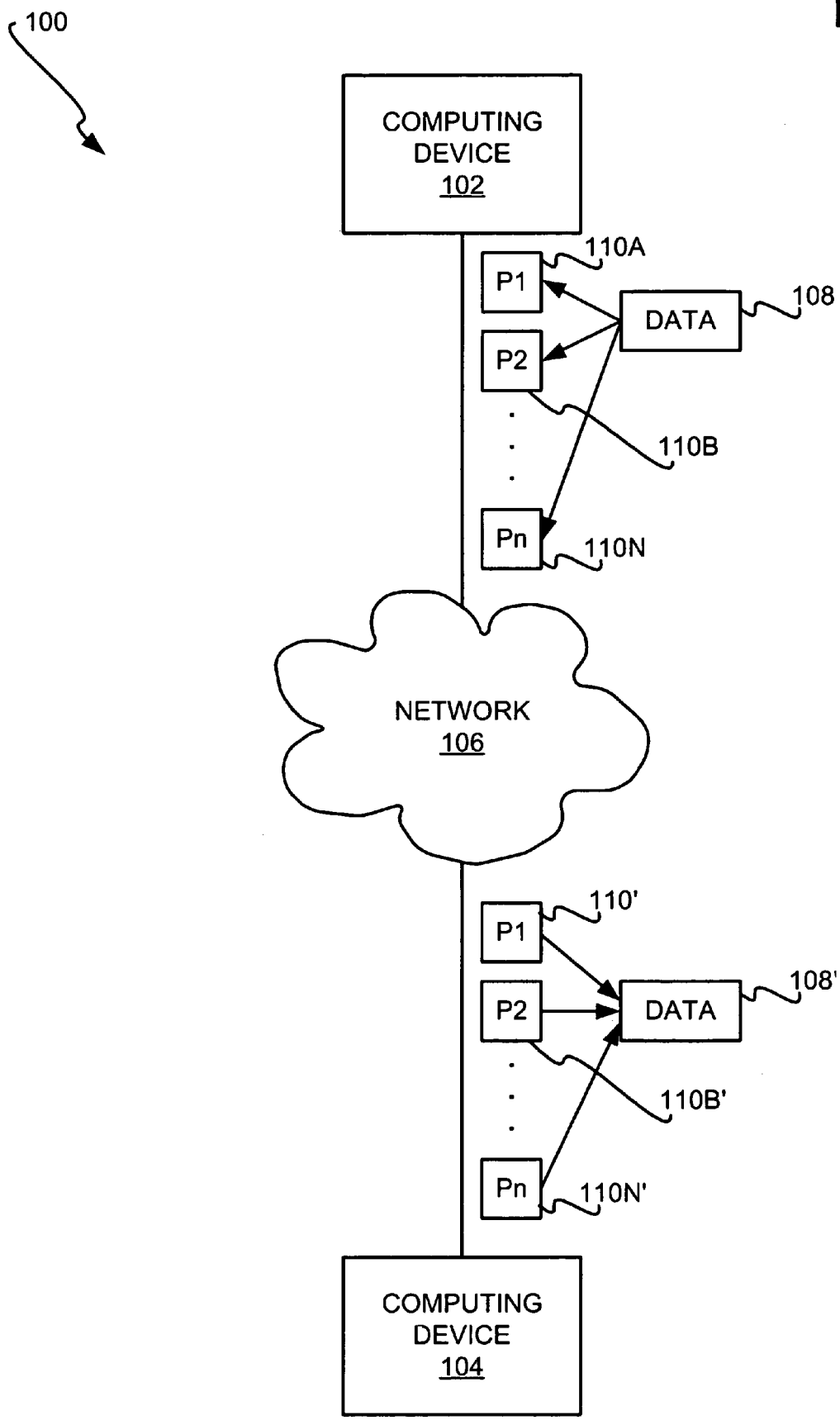
FIG. 1 is a diagram of a system in which data packets are segmented into packet fragments for transmission over a network, and upon receipt, the packet fragments are assembled into the data packets, according to an embodiment of the invention.

FIG. 1 shows a system 100 in which a data packet 108 is transmitted from a computing device 102 over a network 106 to a computing device 104, according to an embodiment of the invention. The system 100 thus includes the computing devices 102 and 104, and the network 106 to which the computing devices 102 and 104 are communicatively coupled. The computing devices 102 and 104 are each any type of computing device that is able to communicate over the network 106. As such, the computing devices 102 and 104 may each be or include a desktop computing device, a laptop, notebook, or portable computing device, a personal-digital assistant (PDA) computing device, a mobile or cellular phone computing device, or another type of computing device. The network 106 may be or include one or more of wired and wireless networks, Ethernet-type networks, intranets, extranets, the Internet, and/or telephony networks, among other types of networks.

The network 106 is a packet driven, or packetized, network. The network 106 thus may be or include an Internet Protocol (IP) network, including a Transmission Control Protocol (TCP)/IP network and/or a User Datagram Protocol (UDP)/IP network, among other types of networks. A packetized network is one in which a packet of data is communicated thereover by having the data divided, split, segmented, or fragmented, over a number of different packet fragments at the sending end, and where the data is reassembled from the packet fragments at the receiving end. If the packet fragments are received out of order, they are reordered for proper assembly at the receiving end.

FIG. 1 shows an example data packet 108 that is divided into a number of packet fragments 110A, 110B, . . . , 110N at the computing device 102 for transmission over the network 106 to the computing device 104. The packet fragments 110A, 110B, . . . , 110N are collectively referred to as the packet fragments 110. The computing device 104 receives the packet fragments 110 as transmitted by the computing device 102 over the network 106, where the packet fragments 110 as received by the computing device 104 are denoted as the packet fragments 110' including the fragments 110A', 110B', . . . , 110N'. The order in which the packet fragments 110 arrive through the network 106 at the computing device 104 as the packet fragments 110' is not necessarily guaranteed. Therefore, the computing device 104 reorders the packet fragments 110' in the order in which they were originally sent by the computing device 102. Once all of the packet fragments 110' have been received, the computing device 104 is able to reassemble the data packet 108, as denoted as the data packet 108' in FIG. 1. In this way, data packets are sent over a network using what are referred to herein as packet fragments.

Figure 2:
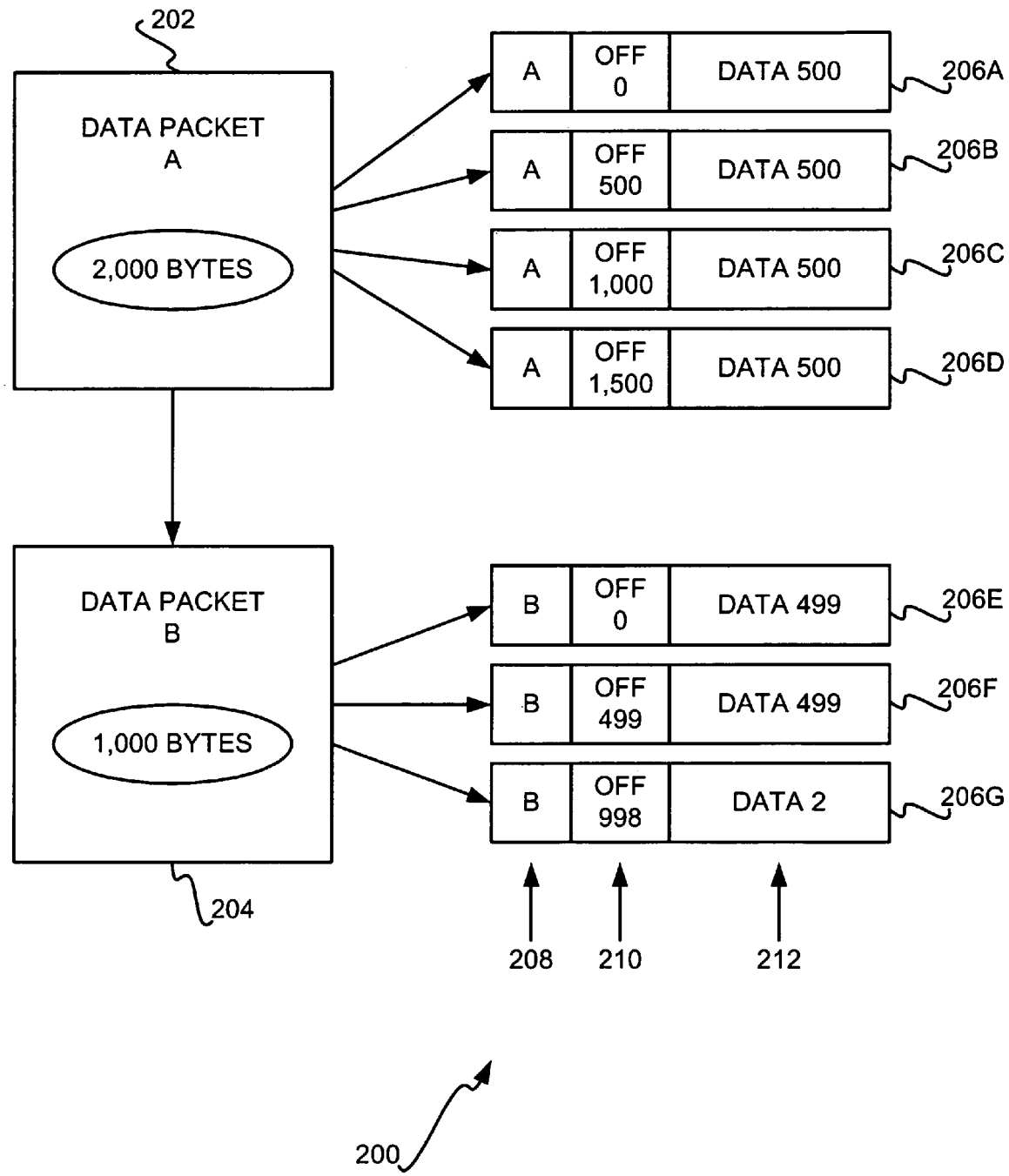
FIG. 2 is a diagram depicting how data packets are segmented into packet fragments at a dynamically adjustable fragment boundary that changes when identifiers of the data packets roll over, according to an embodiment of the invention.

FIG. 2 shows an approach for segmenting, or dividing, data packets into packet fragments in relation to a particular example 200, according to an embodiment of the invention. The data packet 202, having 2,000 bytes of data, is segmented into the packet fragments 206A, 206B, 206C, and 206D for transmission over a network. Next, the data packet 204, having 1,000 bytes of data, is segmented into the packet fragments 206E, 206F, and 206G for transmission over the network. The packet fragments 206A, 206B, 206C, 206D, 206E, 206F, and 206G are collectively referred to as the packet fragments 206. Each of the packet fragments 206 has an n-bit identifier 208, a fragment offset identifier 210 that specifies the location of the fragment in relation to the other fragments of the same data packet, and the data 212 that is the portion of the data of a corresponding data packet fragmented into that packet fragment. Each of these different parts of the packet fragments 206 is now described in detail. However, those of ordinary skill within the art can appreciate that the packet fragments 206 may have other parts or fields in addition to and/or in lieu of those depicted in FIG. 2.

A fragment boundary specifies the maximum amount of data of one of the data packets 202 and 204 that can be stored within one of the packet fragments 206. Therefore, segmenting the data packets 202 and 204 includes generating the packet fragments 206, and copying parts of the data of the data packets 202 and 204 into those packet fragments 206 in increments not exceeding the fragment boundary, until all such data has been copied to packet fragments 206. For example, the data packet 202 includes 2,000 bytes of data. Where the fragment boundary is 500 bytes, the first 500 bytes of data of the data packet 202 are inserted into the packet fragment 206A as its data 212, and the second 500 bytes of data of the data packet 202 are inserted into the packet fragment 206B as its data 212. The third 500 bytes of data of the data packet 202 are inserted into the packet fragment 206C as its data 212, and the final 500 bytes of data of the data packet 202 are inserted into the packet fragment 206D as its data 212.

As another example, the data packet 204 includes 1,000 bytes of data. Where the fragment boundary is instead 499 bytes, the first 499 bytes of data of the data packet 204 are inserted into the packet fragment 206E as its data 212, and the second 499 bytes of data of the data packet 204 are inserted into the packet fragment 206F as its data 212. The remaining and final two bytes of data of the data packet 204 are inserted into the packet fragment 206G as its data 212.

The n-bit identifier 208 of each of the packet fragments 206 is used as follows. Each of the packet fragments 206 is assigned the n-bit identifier 208. All of the packet fragments of a given data packet receive the identifier of the data packet. Thus, all of the packet fragments 206A, 206B, 206C, and 206D have the value A for the packet identifier 208, where the data packet 202 has the packet identifier A. Similarly, all of the packet fragments 206E, 206F, and 206G have the value B for the packet identifier 208, where the data packet 204 has the packet identifier B. When a new data packet is to be segmented, the n-bit identifier 208 is incremented (or decremented) by one (or another value). Once the n-bit identifier reaches a maximum value, the next time it is incremented it rolls over to a minimum value; alternatively, once the n-bit identifier reaches a minimum value, the next time it is decremented it rolls over to a maximum value. The n-bit identifier is thus an identifier that identifies a particular data packet as compared to other data packets. Because the n-bit identifier rolls over, the same value of the identifier is used every $2^n$ data packets.

For example, if the n-bit identifier is sixteen bits in length, then the minimum value of the identifier may be 0x0000, and the maximum value of the identifier may be 0xFFFF. A first data packet may receive the identifier 0x0000, a second data packet may receive the identifier 0x0001, and so on, where a $2^n$-th data packet receives the identifier 0xFFFF. The next data packet, which is the $(2^n+1)$-th packet, receives the identifier 0x0000. That is, when the value of the identifier has been incremented past its maximum value, it rolls over to its minimum value in one embodiment. In another embodiment, the value of the identifier is decremented between data packets, instead of being incremented, such that it rolls over to its maximum value once it has been decremented past its minimum value.

The fragment offset identifier 210 of the packet fragments 206 is a field that specifies the location or order of the packet fragments 206 in relation to other of the packet fragments 206 of the same data packet. Thus, the fragment offset identifier 210 of the packet fragments 206A, 206B, 206C, and 206D is equal to 0, 500, 1,000, and 1,500, respectively. This means that the packet fragment 206A includes the data of the data packet 202 beginning with byte 0 of the packet 202, that the fragment 206B includes the data of the packet 202 beginning with byte 500, that the fragment 206C includes the data of the packet 202 beginning with byte 1,000, and that the fragment 206D includes the data beginning with byte 1,500 of the packet 202. The fragment offset identifier 210 of the packet fragments 206E, 206F, and 206G is equal to 0, 499, and 998, respectively. Therefore, the packet fragment 206E includes the data of the data packet 204 beginning with byte 0 of the packet 204, the fragment 206F includes the data of the data packet 204 beginning with byte 499, and the fragment 206G includes the data of the data packet 204 beginning with byte 998.

The fragment offset identifier 210 is used to reorder packet fragments when they are received. For instance, the packet fragments 206A, 206B, 206C, and 206D may be received out of order. However, these fragments can be reordered correctly for reassembling the data packet 202 by ordering them in numerical order in accordance with their values for the fragment offset identifier 210. The fragment 206A, for instance, includes 500 bytes of data 212 of the data packet 202 having a value 208 for the identifier 208, beginning at byte 0 as specified in the identifier 210. The fragment 206B includes 500 bytes of data 212 of the data packet 202, beginning at byte 500. Similarly, the fragment 206C includes 500 bytes of data 212 of the data packet 202 beginning at byte 1,000, and the fragment 206D includes 500 bytes of data 212 of the packet 202 beginning at byte 1,500.

Figure 3:
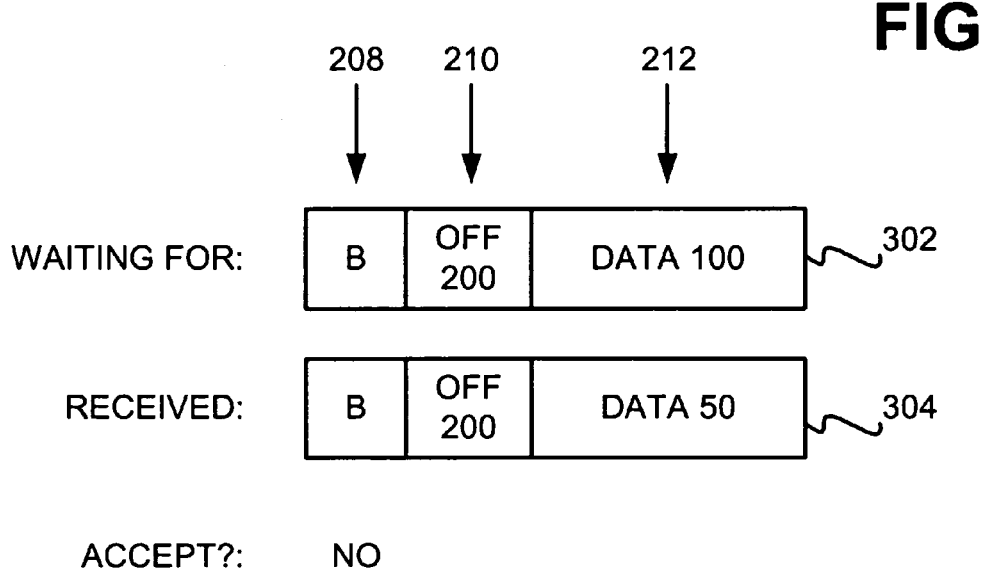
FIG. 3 is a diagram depicting how a received packet fragment is evaluated against an expected packet fragment to determine whether to accept, or use, the received packet fragment, according to an embodiment of the invention, where the received packet fragment contains less data than in the expected packet fragment.
Figure 4:
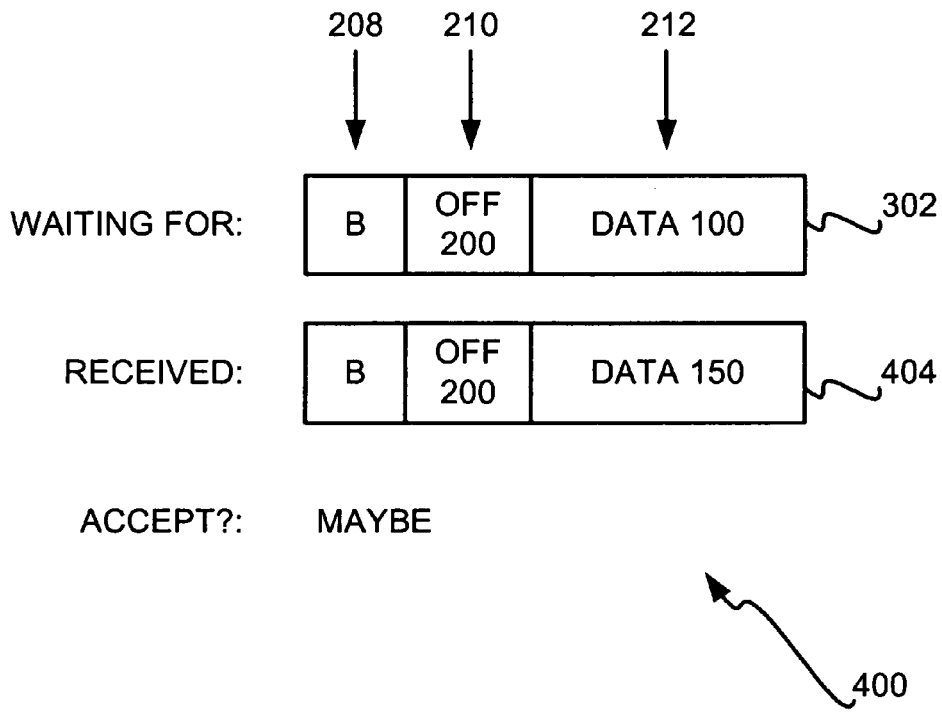
FIG. 4 is a diagram depicting how a received packet fragment is evaluated against an expected packet fragment to determine whether to accept, or use, the received packet fragment, according to an embodiment of the invention, where the received packet fragment contains more data than in the expected packet fragment.

FIGS. 3 and 4 show two scenarios 300 and 400, respectively, as to how received packet fragments are evaluated against an expected packet fragment that has not yet been received, according to an embodiment of the invention. An expected packet fragment 302 has not yet been received for a data packet having the identifier B. The receiving computing device can determine that the expected packet fragment 302 has not been received, because three other packet fragments for a data packet having the identifier B may have already been received, which are not shown in FIGS. 3 and 4. The first such packet fragment may have had the value 0 for its offset identifier 210, and may have included 100 bytes of data 212, indicating that this packet fragment includes the first 100 bytes of data of the data packet. The second packet fragment may have had the value 100 for its offset identifier 210, and may have also included 100 bytes of data 212, indicating that this packet fragment includes 100 bytes of data of the data packet beginning at byte 100. The third packet fragment may have had the value 300 for its offset identifier 210, and may have included 50 bytes of data 212, indicating that this packet fragment includes 50 bytes of data of the data packet beginning at byte 300.

Therefore, the receiving computing device is able to conclude that it is missing bytes 200-299 of the data packet having the identifier B, because it already has bytes 0-200 of the data packet from the first two received packet fragments and bytes 300-349 of this data packet from the third received packet fragment. Because these three packet fragments had as the offset identifier 210 values that are multiples of 100, the receiving computing device further can conclude that the missing bytes 200-299 of the data packet should come in a single packet fragment containing 100 bytes of data. Hence, the receiving computing device is waiting for the expected packet fragment 302 having these characteristics.

In FIG. 3, the packet fragment 304 is received before the packet fragment 302 is received, if ever. Thus, while the receiving computing device is waiting for the packet fragment 302, the packet fragment 304 is instead received. The device notes that the n-bit identifier 208 of the packet fragment 304 that has been received has a value of B. As such, the n-bit identifier 208 of the packet fragment 304 is the same as the already received packet fragments, and may be the missing packet fragment 302 that is expected.

However, the receiving computing device is able to recognize that the expected packet fragment 302 should include 100 bytes of data 212, at an offset identifier 210 having a value of 200 bytes. Although the offset identifier 210 of the received packet fragment 304 has a value of 200 bytes, the received packet fragment 304 only includes 50 bytes of data 212. For instance, the received packet fragment 304 may have been generated by a fragment boundary of 50 bytes, where the data of a data packet was segmented into different packet fragments at boundaries of 50 bytes, such that there are at most 50 bytes of data within each packet fragment for this data packet.

Therefore, the receiving computing device is able to conclude that the packet fragment 304 is not the packet fragment 302 that it has been waiting for. The packet fragment 304 is not accepted as the final packet fragment that the receiving computing device needs to reassemble the data packet in question. That is, where a received packet fragment was generated with a fragment boundary that is less than the fragment boundary with which the expected packet fragment was generated, it can be concluded that the received packet fragment is not the expected packet fragment. Put another way, where a received packet fragment contains less data than the amount of data expected to be received in an expected packet fragment, it can be concluded that the received packet fragment is not the expected fragment.

By comparison, in FIG. 4, a packet fragment 404 is received before the packet fragment 302 is received, if ever. Thus, while the receiving computing device is waiting for the packet fragment 302, the packet fragment 404 is instead received. The device again notes that the n-bit identifier 208 of the packet fragment 404 that has been received has a value of B. As such, the n-bit identifier 208 of the packet fragment 404 is the same as compared to the three other packet fragments that have already been received.

However, the receiving computing device is able to recognize that the expected packet fragment 302 should include 100 bytes of data 212, at an offset identifier 210 having a value of 200 bytes. Although the offset identifier 210 of the received packet fragment 404 has a value of 200 bytes, the received packet fragment 404 contains too much data, specifically 150 bytes of data 212. For instance, the received packet fragment 404 may have been generated by a fragment boundary of 200 bytes, where the data of a data packet was segment into different packet fragments at boundaries of 200 bytes, such that there are at most 200 bytes of data within each packet fragment for this data packet.

In one embodiment, the received packet fragment 404 is therefore discarded as not being the expected packet fragment 302 for which the receiving computing device has been waiting. However, in another embodiment, the received packet fragment 404 is not dismissed out of hand. This is because in some types of packetized protocols, a proper packet may occasionally have more bytes than expected, due to the data of another, immediately adjacent-in-order packet fragment also being erroneously included. Therefore, the receiving computing device may not be able to immediately decisively conclude that the packet fragment 404 is not the expected packet fragment 302.

As a result, the receiving computing device performs one more verification process. The device examines the excess 100 bytes of the data 212 of the packet fragment 404 against the data of the data packet that has already been received. That is, the receiving computing device, as has been described, has already received bytes 0-199 of the data packet from the first two received packet fragments, and bytes 300-349 of the data packet from the third received packet fragment. Therefore, the receiving computing device is waiting for the expected packet fragment 302 that has bytes 200-299 of the data packet. However, the data 212 of the packet fragment 404 has 150 bytes.

The last 50 bytes of the data 212 of the packet fragment 404 are therefore compared against bytes 300-349 of the data packet that already have been received. If these 50 bytes match bytes 300-349, then the receiving computing device nevertheless concludes that it has received the expected packet fragment 302 in receiving the packet fragment 304, in this embodiment of the invention. If these 50 bytes do not match bytes 300-349, then the receiving computing device discards the packet fragment 304, and still waits for the packet fragment 302 to properly assemble the packet. The last 50 bytes of the data 212 are referred to as the excess data, because it is in excess as to the 100 bytes of data 212 in the expected packet fragment 302. Bytes 300-349 of the data packet that have already been assembled are referred to as the overlapped data, because it is the data that the excess data overlaps.

Figure 5:
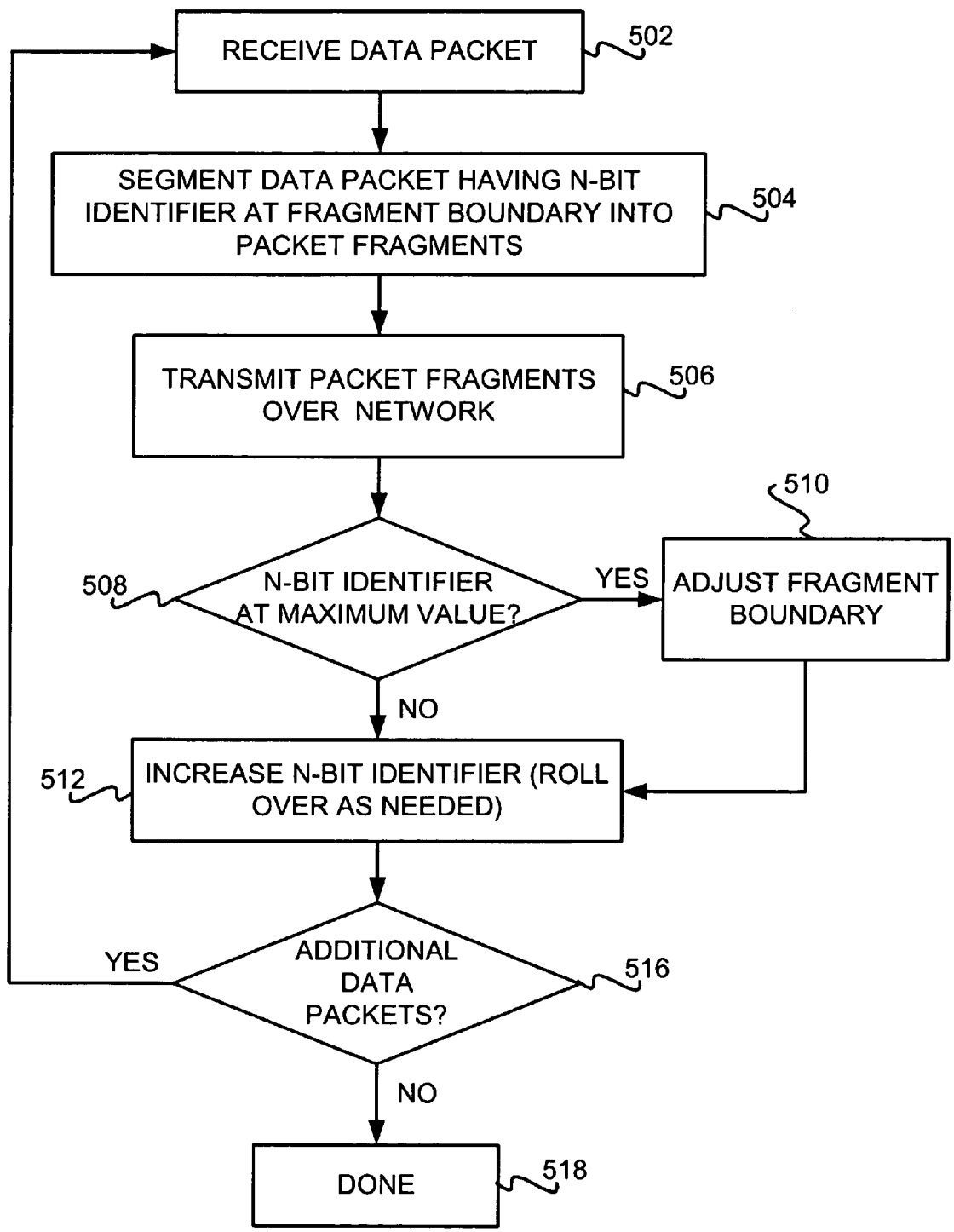
FIG. 5 is a flowchart of a method for segmenting data packets into packet fragments for transmission over a network, according to an embodiment of the invention.

FIG. 5 shows a method 500 for segmenting data packets into packet fragments for transmission over a network, according to an embodiment of the invention. A data packet having data that is to be transmitted over the network is received (502). The data of the data packet is segmented at a dynamically adjustable fragment boundary into one or more packet fragments, where the data packet and the packet fragments each have the same n-bit identifier (504). For instance, if the data of the data packet is 1,500 bytes in size, and the fragment boundary is 500 bytes, then the first 500 bytes of the data of the data packet are segmented into a first packet fragment, the second 500 bytes are segmented into a second packet fragment, and the third 500 bytes are segmented into a third fragment. These packet fragments are then transmitted over the network (506).

If the n-bit identifier of the data packet that has just been transmitted is at a maximum value (508), then the fragment boundary is adjusted so that it is now different (510), as has been described, and as is particularly described in one embodiment later in the detailed description. For instance, if the identifier is sixteen bits in length, and if the identifier has the hexadecimal value 0xFFFF, which is the maximum value for a sixteen-bit number, then the fragment boundary is adjusted. In either case, the n-bit identifier is increased, such as by one bit (512), where if the n-bit identifier is at the maximum value before being increased, it rolls over to a minimum value. For instance, if the identifier is sixteen bits in length and has the hexadecimal value 0xFFFF, increasing it by one bit yields the minimum value 0x0000. If there are additional data packets to be transmitted (516), then the method 500 repeats at 502. Once all of the data packets have been processed (516), then the method 500 is finished (518).

Figure 6:
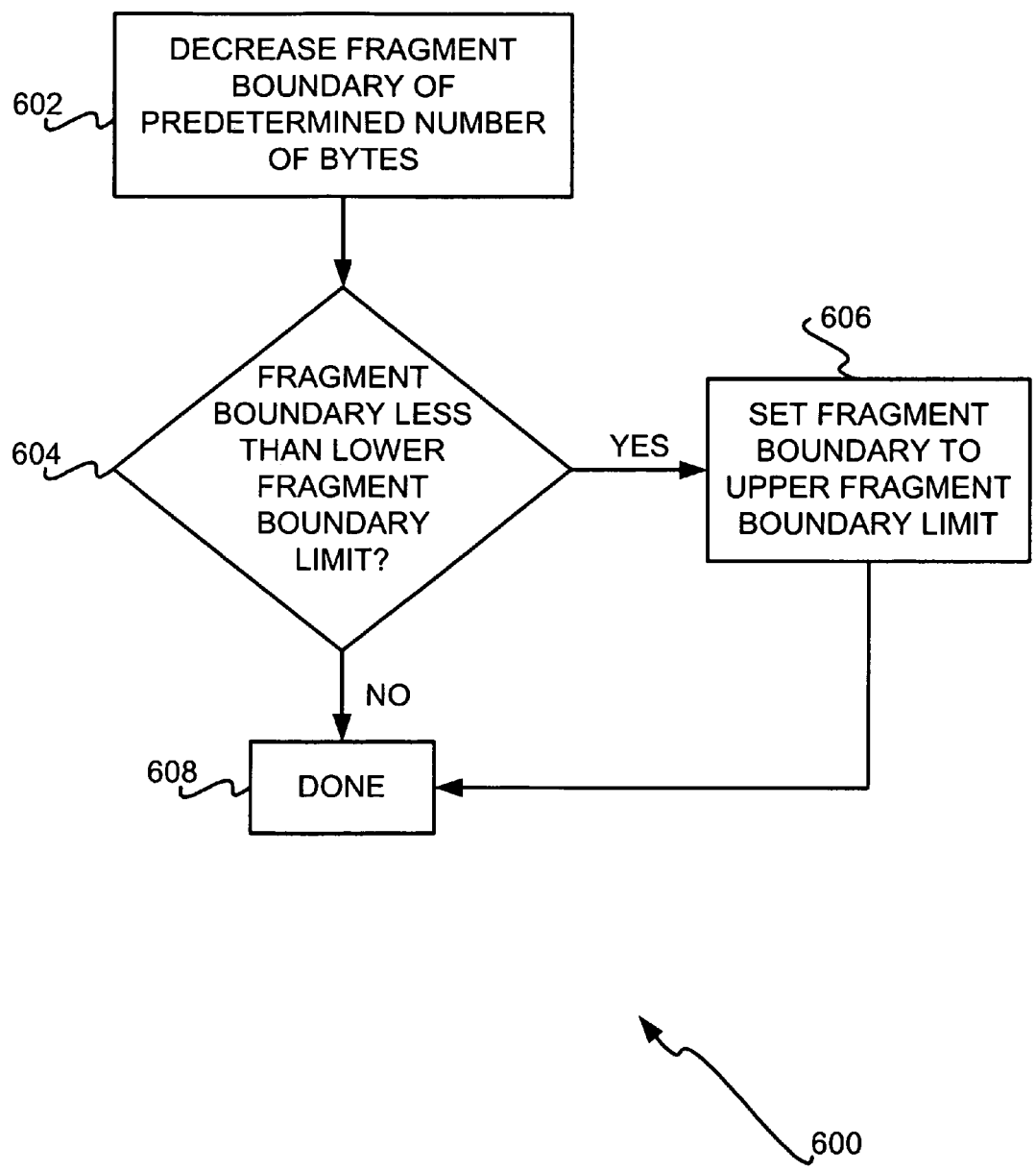
FIG. 6 is a flowchart of a method for adjusting a fragment boundary used in segmenting data packets into packet fragments, according to an embodiment of the invention.

FIG. 6 shows a method 600 for adjusting the fragment boundary, according to an embodiment of the invention. For instance, the method 600 may be performed as 510 of the method 500 of FIG. 5. First, the fragment boundary is decreased by a predetermined number of bytes (602), such as by one byte. If the fragment boundary is less than a given lower fragment boundary limit (604), such as 400 bytes, then the fragment boundary is reset to a given upper fragment boundary limit (606), such as 500 bytes. In either case, the method 600 is finished (608), and the fragment boundary is now different than before. The lower fragment boundary limit and the upper fragment boundary limit can be values as desired. For instance, it may be desirable to ensure that the fragments do not become too small, nor too large. Thus, a lower fragment boundary limit of 400 bytes, and an upper fragment boundary limit of 500 bytes, ensures that the fragments are no smaller than 400 bytes in size, and no larger than 500 bytes in size.

Figure 7:
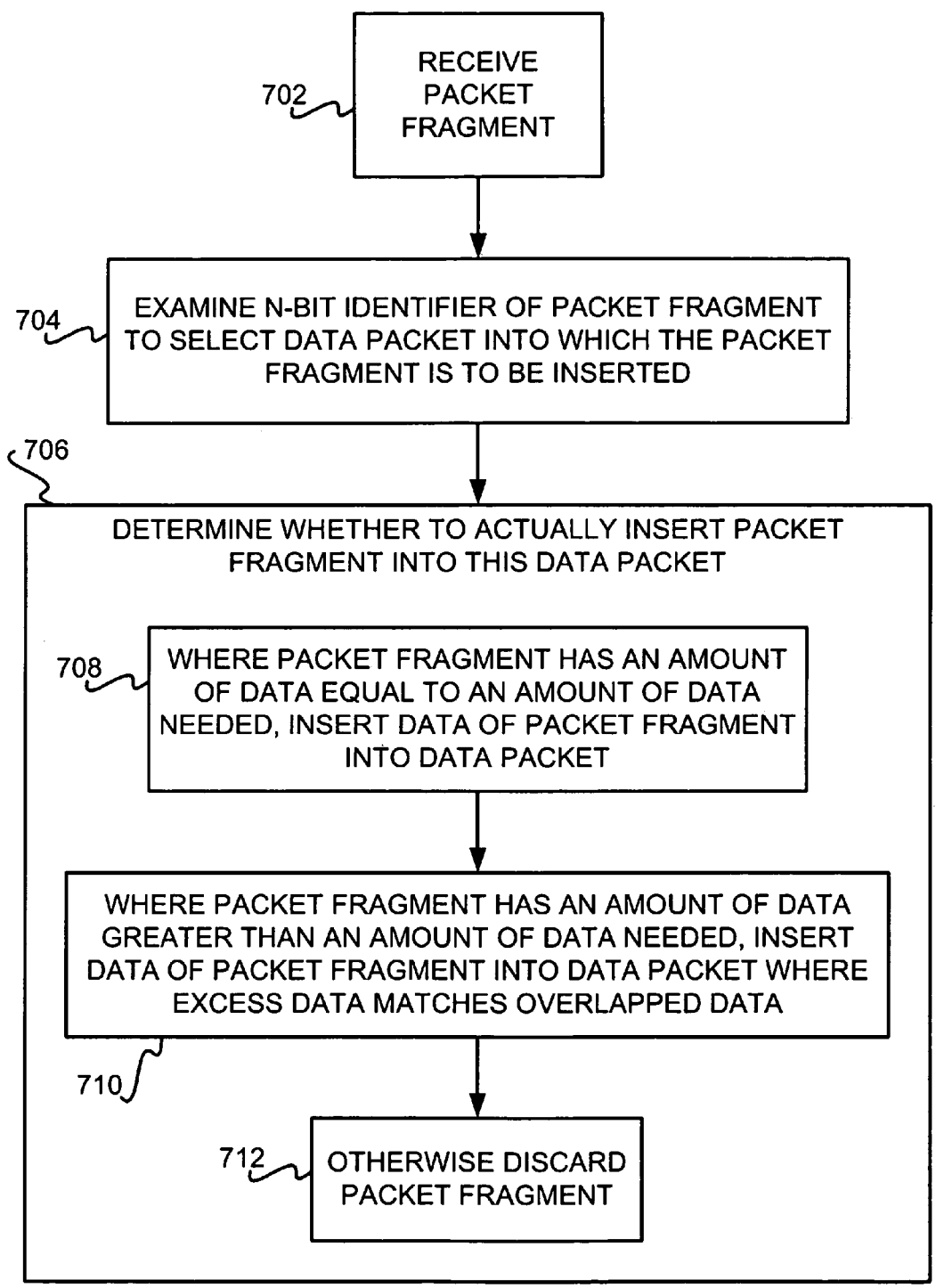
FIG. 7 is a flowchart of a method for receiving packet fragments and reassembling data packets therefrom, according to an embodiment of the invention.

FIG. 7 shows a method 700 for receiving packet fragments, and reassembling data packets from the received packet fragments, according to an embodiment of the invention. The method 700 is particularly performed each time a packet fragment is received over a network. Thus, a packet fragment that has been transmitted over a network is first received (702).

An n-bit identifier of the packet fragment is examined to select a data packet into which the packet fragment is to be inserted (704). For instance, in the example 200 of FIG. 2, when the packet fragment 206A is first received, there may be no existing data packet that is waiting to be reassembled, and the packet fragment 206A may indicate that it is the first packet fragment into which the data of a data packet has been segmented. This is because there is no data packet that has been created yet that has the n-bit identifier A. Therefore, a new data packet 202 is created that is to be reassembled at least in part on the basis of the packet fragment 206A. As another example, when the packet fragment 206B is received, the data packet 202 is selected, such that the data packet 200 is to be reassembled also at least in part on the basis of the packet fragment 206B.

In general, a data packet is selected in 704 based on the n-bit identifier of the packet fragment just received being equal to the n-bit identifiers of other packet fragments that have already been received. In the example 200 of FIG. 2, if the packet fragments 206A, 206B, 206C, and 206D are received in order, when the packet fragment 206A is received, there is no existing data packet that is waiting to be reassembled, and the packet 206A may indicate that it is the first packet fragment into which the data of a data packet having the n-bit identifier A has been segmented. Therefore, the new data packet 202 is created. Once the packet fragment 206B has been received, the data packet 202 is selected for insertion thereinto of the packet fragment 206B because the identifier 208 of the packet fragment 206B has the same value as that of the packet fragment 206A. Similarly, once the fragments 206C and 206D have been received, the data packet 202 is selected for insertion thereinto of the fragments 206C and 206D because the identifier 208 of the fragments 206C and 206D is the same value as that of the fragments 206A and 206B.

Next, the method 700 determines whether to actually insert the received packet fragment into the selected data packet (706). The determination made in 706 is to ensure that the proper packet fragment is inserted into the proper data packet, as has been described in detail in relation to the scenarios 300 and 400 of FIGS. 3 and 4, respectively. Therefore, as has been described, the fragment offset identifier of the received packet fragment may be examined and used to determine whether to actually insert the received packet fragment into the selected data packet.

More specifically, if the packet fragment has an amount of data equal to the amount of data needed for assembly of the data packet, then the data of the packet fragment is inserted into the data packet for reassembly thereof (708). For instance, in the example 200 of FIG. 2, if the packet fragments 206A, 206C, and 206D have all already been received, then it is known that a packet fragment, like the packet fragment 206B, having an identifier with a value A is needed. If a packet fragment with a value of A is received, then in 704 of the method 700 the data packet into which the data of the packet fragments 206A, 206C, and 206D have already been inserted is selected. In 708, then, the data of the received packet fragment is actually inserted into this selected data packet if the amount of data of the received packet fragment is equal to the amount of data needed. Because the packet fragment 206B is needed in this example, if the received packet fragment has 500 bytes of data, then it is inserted, such that the data packet 202 is reassembled.

However, if the packet fragment has an amount of data greater than the amount of data needed for assembly of the data packet, then the data of the packet fragment is inserted into the data packet for reassembly thereof if the excess data of the packet fragment matches overlapped data already present in the data packet (710). The performance of 710 of the method 700 is the scenario 400 of FIG. 4 that has been described, and which is not repeated here to avoid redundancy. If neither the test of 708 nor the test of 710 results in the data of the received packet fragment being inserted into the data packet selected, however, then the data of the packet fragment is discarded as to the selected data packet (712). That is, the data of the packet fragment is not inserted into the data packet selected in 704. For instance, the amount of data in the packet fragment may be less than the amount of data needed for assembly of the data packet, as has been described in relation to the scenario 300 of FIG. 3.

Figure 8:
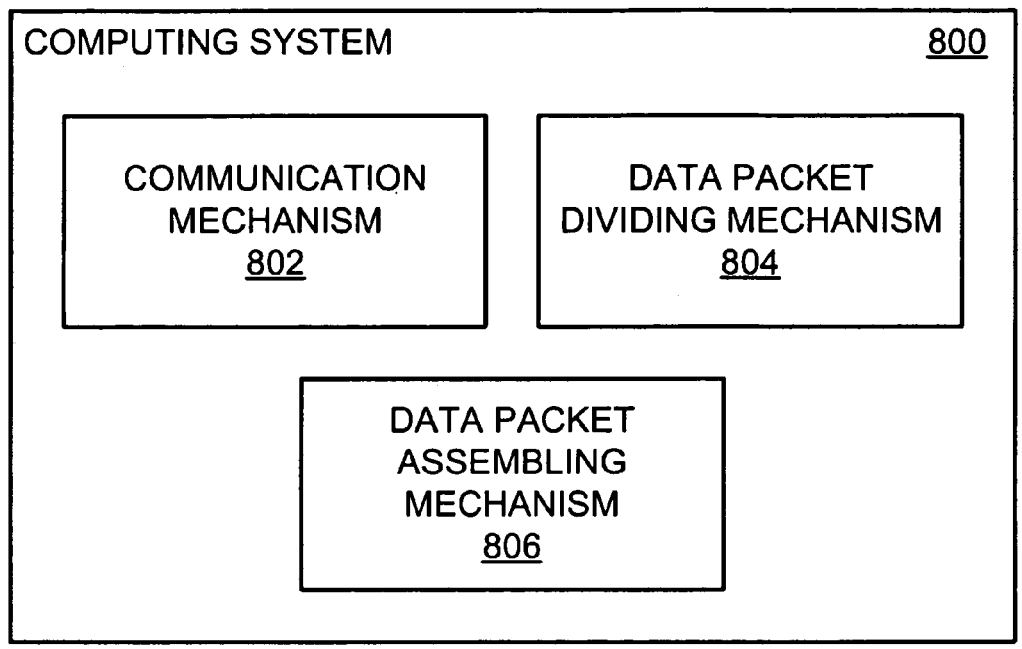
FIG. 8 is a rudimentary diagram of a computing system, according to an embodiment of the invention.

Finally, FIG. 8 shows a rudimentary computing system 800, according to an embodiment of the invention. The computing system 800 may implement either or both of the computing devices 102 and 104 in one embodiment of the invention. The computing system 800 is depicted as including a communication mechanism 802, a data packet dividing mechanism 804, and a data packet assembling mechanism 806. However, as can be appreciated by those of ordinary skill within the art, the system 800 may include components in addition to and/or in lieu of those depicted in FIG. 8.

Each of the mechanisms 802, 804, and 806 may be implemented in hardware, software, or a combination of hardware and software. The communication mechanism 802 is specifically for communicatively coupling the computing system 800 to a network, such as the network 106 of FIG. 1. As such, the communication mechanism 802 is able to receive packet fragments from over the network 106 and is further able to send or transmit packet fragments over the network.

The data packet dividing mechanism 804 is to segment data packets into packet fragments at a dynamically adjustable fragment boundary, where the fragment boundary changes every time n-bit identifiers of the packet fragments roll over, as has been described. The packet fragments generated by the mechanism 804 are for transmission over the network 106. The fragment boundary is adjustable in that it can be changed. The fragment boundary is further dynamically adjustable in that it can be changed on a data packet-by-data packet basis, as needed. The mechanism 804 embeds n-bit identifiers into the packet fragments, as well as the fragment offset identifiers into the packet fragments, as has been described.

The data packet assembling mechanism 806 is to assemble data packets from received packet fragments. The mechanism 806 thus inserts data of received packet fragments into data packets based on the n-bit identifiers of the received packet fragments, as has been described. Even when a data packet is selected for insertion thereinto of data of a packet fragment, the data of the packet fragment is not inserted into the data packet unless it has an amount of data needed for reassembly of the data packet, or has excess data that matches existing data of the data packet, as has also been described.

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. It is manifestly intended that this invention be limited only by the claims and equivalents thereof.

I claim:

1. A method comprising:
receiving a packet fragment transmitted over a network;
examining an n-bit identifier of the packet fragment to select a data packet into which the packet fragment is to be inserted;
where the packet fragment has an amount of data equal to an amount of data needed within the data packet to fit within the data packet, inserting the packet fragment into the data packet; and,
where the amount of data of the packet fragment is greater than the amount of data needed within the data packet to fit within the data packet, determining whether an excess amount of data of the packet fragment matches an overlapped amount of data already within the data packet; and,
where the excess amount of data of the packet fragment matches the overlapped amount of data, inserting the packet fragment into the data packet.

2. The method of claim 1, farther comprising, otherwise, discarding the packet fragment such that the packet fragment is not inserted into the data packet.

3. The method of claim 1, farther comprising:
where the amount of data of the packet fragment is less than the amount of data needed within the data packet to fit within the data packet, discarding the packet fragment such that the packet fragment is not inserted into the data packet.

4. The method of claim 1, wherein whether the amount of data of the packet fragment is equal to the amount of data needed within the data packet to fit within the data packet is determined by examining and using a fragment offset identifier of the packet fragment having a number of bits specifying a location of the packet fragment in relation to other packet fragments of a same data packet.

5. The method of claim 1, wherein examining the n-bit identifier of the packet fragment to select the data packet into which the packet fragment is to be inserted comprises selecting the data packet based on the n-bit identifier of the packet fragment relative to n-bit identifiers of other packet fragments already inserted into the data packet.

6. A method comprising:
receiving a packet fragment transmitted over a network;
examining an n-bit identifier of the packet fragment to select a data packet into which the packet fragment is to be inserted;
where the packet fragment has an amount of data equal to an amount of data needed within the data packet to fit within the data packet, inserting the packet fragment into the data packet; and,
where the amount of data of the packet fragment is less than the amount of data needed within the data packet to fit within the data packet, discarding the packet fragment such that the packet fragment is not inserted into the data packet.

7. The method of claim 6, further comprising, otherwise, discarding the packet fragment such that the packet fragment is not inserted into the data packet.

8. The method of claim 6, wherein whether the amount of data of the packet fragment is equal to the amount of data needed within the data packet to fit within the data packet is determined by examining and using a fragment offset identifier of the packet fragment having a number of bits specifying a location of the packet fragment in relation to other packet fragments of a same data packet.

9. The method of claim 6, wherein examining the n-bit identifier of the packet fragment to select the data packet into which the packet fragment is to be inserted comprises selecting the data packet based on the n-bit identifier of the packet fragment relative to n-bit identifiers of other packet fragments already inserted into the data packet.

* * * * *